United States Patent Office 3,291,960
Patented Dec. 13, 1966

3,291,960
CONTROL APPLIANCE FOR SOURCES OF
WELDING CURRENT
E Folkhard, Bad Soden, Taunus, and Horst Keller,
Frankfurt am Main-Griesheim, Germany, assignors to
Messer Griesheim G.m.b.H., Frankfurt am Main, Germany, a corporation of Germany
Filed Dec. 16, 1964, Ser. No. 418,654
Claims priority, application Germany, Dec. 21, 1963,
K 51,698
2 Claims. (Cl. 219—131)

The present invention relates to an appliance for the limitation of the short-circuit current distribution during the procedure of short-circuit arc welding with melting electrode, preferably by using a protective gas especially carbon dioxide.

Current sources with flat static current voltage characteristics are chiefly used today which welding under protective gas with a meltable electrode (MIG-welding). These current sources are known as constant voltage machines. Hereby welding is always effected by means of direct current, whereby the electrode is usually connected with the positive pole of the welding machine.

The advantage concerning these welding machines is, that they possess an automatic regulation, i.e., that the voltage produced by the welding machine is automatically adjusted to the changed supply- and fusing-speed of the welding wire, when there is a change of the wire feed speed. Machines of this kind are also vastly independent from voluntary or involuntary movements at random, by which the distance between the wire exit nozzle of the welding burner and the workpiece is changed. Fluctuations of such a kind occur to a certain extent mainly when manual welding, where by a good automatic regulation effect of the welding machine only minimum changes of the electric arc length are to be registered.

Constant potential-welding machines have shown very satisfactory results in MIG-welding, if there are no, or only some, short-circuits during the procedure of welding. One speaks in this case of a so-called drizzle-like drip-transfer. The raw material is transferred in fine drips on the basic material whereby no real short-circuit occurs between the conducted wire and the welding bath, but the material is transferred drizzle-like in form of fine drips. Such kind of electric arc forms appear especially when using argon or helium as the protective gas.

By the use of carbondioxide as the protective gas, the material transfer is fundamentally altered by the fact that even at comparatively high specific current loads of the welding wire, such large material drops arise that there occur numerous short-circuits during the welding procedure between the conducted welding wire and the welding bath and the workpiece, respectively. When welding thin wires with a diameter which lies generally between 0.6 and 1.2 mm., one tries also when using carbondioxide, as well as argon as the protective gas, to obtain a short-circuit-like drip transfer, as by this method the basic material is less intensively heated than at a continuously burning and not by short-circuits interrupted electric arc.

One succeeds by the above mentioned effect to weld even comparatively thin material according to the MIG-system without running a risk of burning a hole in the welding seam. By this one speaks of a short-circuit-like drip transfer, whereby the short-circuit frequently generally amounts to more than 50 short-circuits per second. The procedure therefore is signified as short electric arc-welding system.

Comparatively high short-circuit peaks arise due to the short-circuits when using the usual constant voltage welding machine, from which results the disadvantage of an increased formation of welding splashes and of a very intensive electric arc. At the same time the seam surface is also usually unfavorably influenced.

In order to meet with the above mentioned effects, it is known to give either a steeper inclination to the static current voltage characteristic curve or to connect in the welding current circuit an additional inductance. Both of the arrangements aim to limit the dynamic short-circuit current to values which are suitable for a welding process; but these arrangements have also disadvantages which cannot be eliminated.

A steeper inclination of the characteristic curve, for instance, diminishes the automatic regulation effect of the constant voltage machine. By this it is meant that the length of the electric arc and thus its stability is unfavorably influenced when the wire feed speed or the distance of the welding burner change. Therefore it is necessary to adjust the open-circuit voltage and the inclination of the characteristic curve exactly to the present wire feed speed in order to receive useful welding results.

It is further well known that by the interpolation of an inductive choke into the welding current, the time slope of the current increase and occurring short-circuit is delayed, by which the short-circuit peaks may be limited. But by this, the disadvantageous effect occurs, however, that the delayed procedure of the current increase also retards the loosening of the welding material drip which was formed. At a high inductance, this may lead to the short-circuit rests to exist permanently and thus an electric arc is no longer formed. At smaller values of the inductance, it can happen that the time of short-circuit will become too small compared with the combustion period of the electric arc, the result of which is a heavily overcambered or convex seam. If the inductance is even more increased, the electric arc will become very hard and welding splashes will arise in higher degree due to the high short-circuit peaks.

Furthermore, it should be considered that the characteristic curve inclination, the inductance and the open-circuit influence each other and that it is therefore very difficult to find a favorable regulation for welding machines in which all these factors are variable.

According to the present invention, a regulation system is proposed which influences the procedure of the short-circuit current in direct current welding machines; according to this system the speed increase of the short-circuit current is stopped after having obtained a certain current value, by intensifying the inductance.

By means of this system, the time slope of the short-circuit current increase can be changed in any way, contrary to the ordinary inductances which are known; i.e., one can for instance obtain first a rapid current increase with a speed of 50,000 A. per second at the point of a short-circuit formation, and when reaching a certain current-value (e.g., 200 A.), the current increase speed is diminished (e.g., to 15,000 A. per second). The procedure may also be executed by not only changing once, but several times, the current increase speed when reaching certain current values. By means of this system one succeeds in limiting the level of the dynamic short-circuit peaks in such a way that neither the characteristic curve inclination is increased, neither the drip loosening is delayed, nor the splash formation is increased.

For the excution of this process, an arrangement is proposed in which one principal inductor is inserted into the direct current-welding circuit and at least one minor branch which is running parallel to it, with an additional inductor which is arranged in series, and an ohmic resistance are added, whereby the inductance of the principal inductor is larger than each of the additional inductors, whereby the value of each ohmic resistance of the minor branch is larger than the value of the ohmic resistance in the principal inductor.

The mode of operation according to the inventive arrangement, is as follows:

At occurrence of a short-circuit, the current increase speed is fixed by the value of the two inductors. Under the condition that the inductance of the principal inductor is high and that one of the additional inductor is small, the current increase is first effected comparatively rapidly according to the smaller inductance. As the additional inductor is connected in series with an ohmic resistance, the current increase speed is maintained up to a current value at which the ohmic resistance limits a further current increase. If, e.g., the voltage of the welding machine amounts to 20 v. and the ohmic resistance to 0.2 ohm, the current will, according to these factors, increase up to a limit value of 100 A. with a current increase speed which corresponds to the smaller inductance of the additional inductor. From this point of time on, the flow of current through the additional circuit, consisting of additional inductor and ohmic resistance which are connected in series, is limited to the above stated value. The short-circuit current has to choose the way through the principal inductor with the large inductance, when a further increase takes place. According to the higher inductance of the principal inductor, the further current increase is forced to proceed less rapidly.

By further development of the invention, it is possible to connect to the principal inductor in parallel not only one system, consisting of secondary inductor and an ohmic series resistance, but several parallel systems in which the values of the additional inductance and the ohmic resistance are adapted to the desired time slope of the short-circuit current. This time slope can, e.g., be regulated in such a way that the current increase speed amounts up to a short-circuit current of 100 A. 80,000 A. per second, up to a short-circuit of 200 A. 40,000 A. per second, up to a short-circuit current of 300 A. 20,000 A. per second and above that to 10,000 A. per second.

According to a further development of the invention it is advisable to grant a considerably high electric conductance to the principal inductor in contrary to the parallel connected ohmic resistance, so that it takes charge of the main part of the current flow during the combustion period of the electric arc, this means during the time where no rapid temporary change of the current is effected. As a result, no steeper inclination of the static characteristic is imposed by force to the constant voltage-current source, whereby the effect of a good automatic regulation is being retained.

Another system for the execution of the inventive process is characterized that there are arranged, into the direct current-welding circuit in series, an additional and a principal inductor with an ohmic resistance parallel to it, whereby the inductance of the principal inductor is larger than that of the additional inductor and whereby the value of the parallel ohmic resistance is larger than the resistance of the two inductors.

The method of operation in this arrangement is as follows:

At occurrence of a short-circuit, the current first flows mainly over the additional inductor and the ohmic resistance which is connected in parallel to the principal inductor. Since the additional inductor has a smaller inductance than the principal inductor, the current increase first takes place comparatively rapidly. If a current value is reached at which the ohmic resistance prevents a further increase, then the further increased short-circuit current flows through the principal inductor. By this is shown that the effect of this modified arranged system is equal to the effect of the first described arrangement. Thereby there is the possibility to change the position of the inductance of the additional inductor in the current source in such a way that a certain inductance is given to the current source itself which should have the same value as the additional inductor, e.g. by corresponding construction of the transformer in a welding rectifier.

The function, according to the system of this invention, is therefore of such a manner that the inductive effect intensifies itself more and more by the increased short-circuit current. Therefore, they do not only distinguish themselves from the inductors known to the present, by the pure difference in procedure, but one can give by means of these new systems a very special suitability for the S.I.G.M.A.-welding to the welding machine. It is, e.g., no longer necessary to give a steeper inclination of the static current voltage-characteristic to the current source which is preferably used for the short electric arc welding. Consequently, it is possible to maintain the effect of a good self-regulation ability of the welding current source. Furthermore the loosening and the cutting off of the melt drip can be considerably accelerated by the initial rapid current increase without having a delay of the drip loosening and a decrease of the short-circuit frequency, as is the case with the ordinary inductors, both of which have unfavorable effects with regard to the appearance of the seam or weld and the stability of the electric arc. A too high increase of the short-circuit current is reliably avoided so that after reaching a certain current value the inductance effect occurs a stronger way so that the short-circuit current first increases rapidly for being heavily detained at a certain value. By this the short-circuit current peak can be limited to an arbitrary chosen maximum value and a too heavy splashing when welding, can be avoided.

According to a further proposal, the principal inductors are provided with a magnetic core and the additional inductors are developed as air core chokes.

Novel features and advantages of the present invention will become apparent to one skilled in the art from a reading of the following description in conjunction with the accompanying drawings wherein similar reference characters refer to similar parts and in which.

Figure 1:
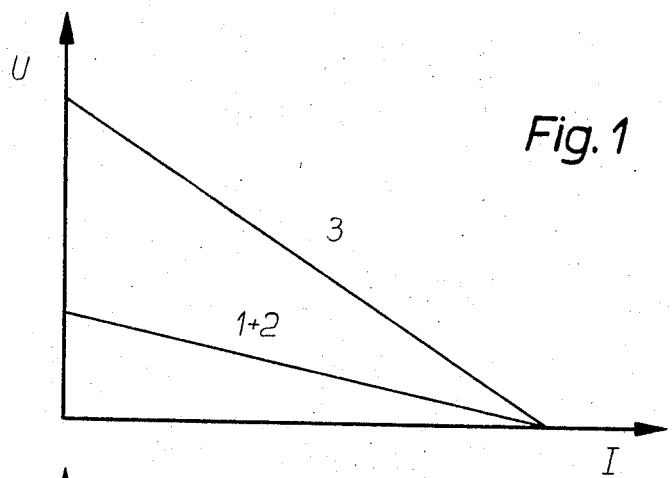
FIG. 1 shows various static characteristics of a direct current welding machine.
Figure 2:
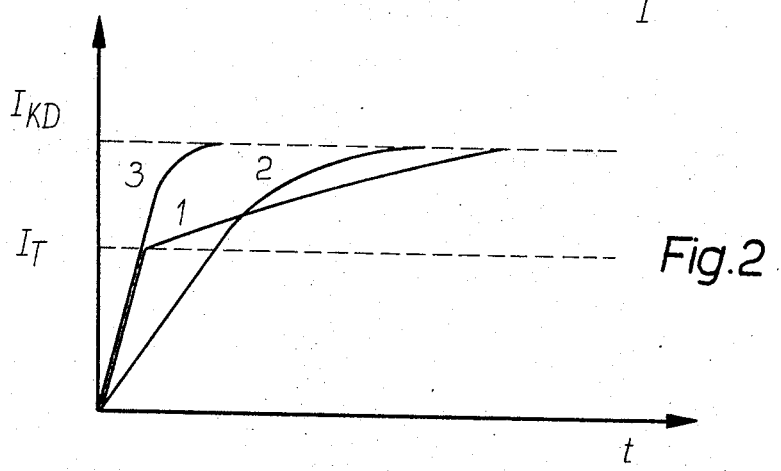
FIG. 2 shows the corresponding dynamic characteristics of the time slope used by the short-circuit current.

Concerning the characteristics shown in FIGS. 1 and 2, it is assumed that in all arrangements, the same short-circuit current is sustained. The sustained short-circuit current is indicated by $I_{KD}$, and the current necessary for the loosening of the drip is labelled $I_T$. Curve 1 indicates the characteristic of the arrangement according to the present invention. The characteristic curves 2 belong to a welding machine with only one inductance in the current circuit and curve 3 indicates characteristics of a welding current machine with a steep inclination of the static characteristic curve. The characteristics show that the above noted self-regulation of the electric arc by a flat characteristic is better in curves 1 and 2 than by a steeper one in curve 3. On the other hand FIG. 2 shows that in the curve 3 the maximum short-circuit current is reached more quickly, namely by a current increase time which is only specified by the unvoluntary inertia of the current source. In curve 2 the current increase time is slower. It is specified by the reciprocal value of the inductance. In curve 1 the procedure in accordance with this invention, the slope first takes place with the same rapidity as in curve 3. Here, however, the current increase deviates at a certain level and continues slowly increasing to the sustained short-circuit current.

Figure 3B:
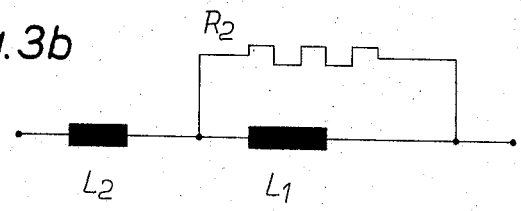
FIG. 3b shows another arrangement, wherein the additional inductor is situated in series with a branch, consisting of the principal inductor with an ohmic resistance which is connected in parallel to it.
Figure 3A:
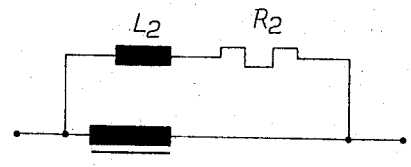
FIG. 3a shows a principal inductor with an additional inductor connected in parallel to it, and an ohmic resistance, the first being arranged in a direct current welding circuit.

The arrangement according to FIG. 3a shows a principal inductor in the current circuit, which has an inductance $L_1$, and an additional branch connected in parallel, which consists of an additional inductor with an inductance $L_2$ and an ohmic resistance $R_2$ connected in series to it. The principal inductor posesses an involuntarily given resistance $R_1$, determined by the cross-sectional area of the conductor, which, however, is far smaller than $R_2$. The inductance of $L_1$ is larger than that of $L_2$. Advantageously $L_1$ is chosen 1.5–20 times as large as $L_2$.

The arrangement according to FIG. 3b, has a direct current circuit a secondary inductor with an inductance $L_2$ and connected in series to it is a principal inductor, with an ohmic resistance connected in parallel. The principal inductor has an inductance $L_1$ which is larger than the inductance of the additional inductor $L_2$. The value of the ohmic resistance $R_2$ is larger than the total of the resistances of the two inductors.

Figure 4:
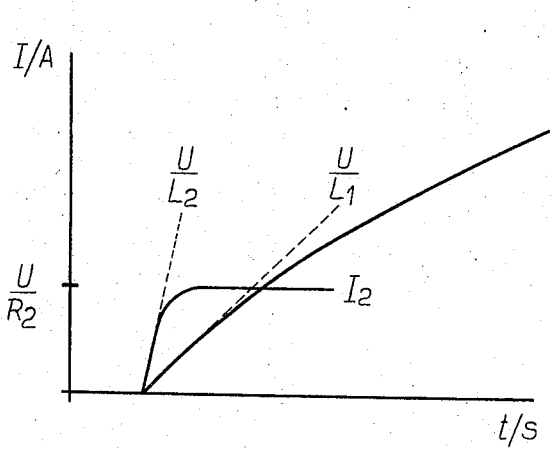
FIG. 4 shows the time slope of the short-circuit current in the principal-and-additional-inductor, when those two are charged separately.
Figure 5:
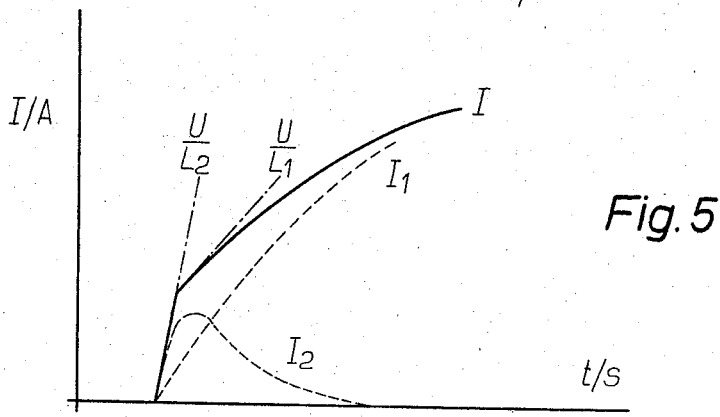
FIG. 5 shows the time slope of the short-circuit current of the whole circuit, when connected in accordance with this invention; the dash lines $I_1$ and $I_2$ show the single currents of of the branches which form the whole current I.

FIG. 4 and FIG. 5 show the characteristics which apply to the arrangement of FIG. 3a, as well as the arrangement of FIG. 3b. As illustrated therein the current increase of the additional circuit $I_2$ first takes place rapidly, according to the smaller inductance $L_2$. This is based on the following formula:

$$\frac{dI_2}{dt} = \frac{U}{L_2}$$

wherein U represents the voltage arising from the current source.

The ohmic resistance $R_2$ limits the current which is flowing through the additional branch, to a maximum value which is specified as follows:

$$I_2 \max. = \frac{U}{R_2}$$

(The inertial resistance of the welding machine may be neglected in this formula.)

The current which flows through the principal inductor, is delayed more intensively according to the higher inductance. The current increase corresponds to the formula:

$$\frac{dI_1}{dt} = \frac{U}{L_1}$$

After a comparatively long space of time, the current reaches a maximum value which is only specified by the internal resistance of the welding machine and by the comparatively low ohmic resistance of the principal inductor $L_1$, as well as by the cables and wires which are connected in the welding circuit.

The dash lines indicate the current loads of the two branches $I_1$ and $I_2$ which represent together the total current I. By this it is apparent, that the current $I_2$ of the additional circuit decreases again after having reached the maximum value, as the principal inductor takes more and more charge of the current transport (current $I_1$), which occurs due to its smaller ohmic resistance. The current which finally flows through the additional circuit, is comparatively small, and results from the proportions of the resistances $R_1$ and $R_2$. For this reason, the cells of the additional circuit can also be adjusted for a comparatively small current, as their load essentially occurs only momentarily before the reaching of the short-circuit current $I_2$.

Figure 6:
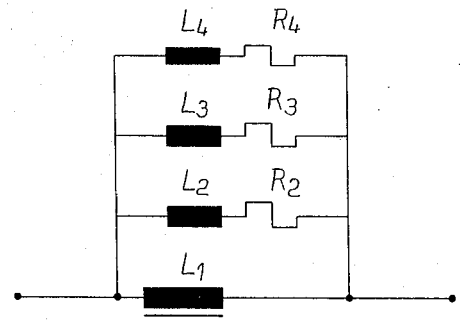
FIG. 6 shows the connection of several additional branches to the principal inductor.

According to FIG. 6 three additional systems are connected to the principal inductor. These systems consist of three additional inductors which are each connected in series with an ohmic resistance.

Figure 7:
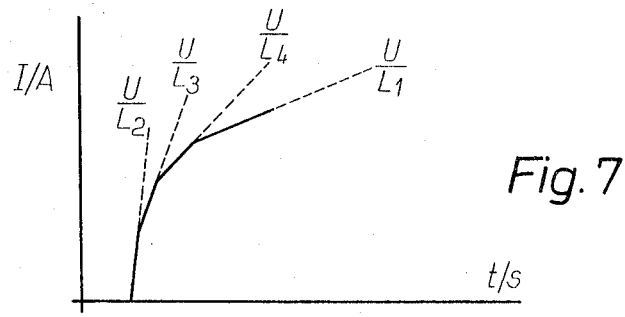
FIG. 7 shows the time slope of the short-circuit current according to the arrangement of FIG. 6.

From FIG. 7, the temporary course of current at a short-circuit can be noted whereby, by a modification of FIG. 4 and FIG. 5, three current points always occur, at which time slope of the current increase changes according to the inductivities of $L_2$, $L_3$ and finally $L_4$.

The additional inductors which are connected in parallel, may be in a way that there automatically results, by a correspondent choice of a conductor material and a cross section, the desired ohmic resistance of the additional branch at the moment where the desired inductance is reached, so that by this an additional ohmic resistance is rendered unnecessary.

When using, e.g., an air core choke with a diameter of 60 mm. and 90 turns, the inductance amounts to 120 microhenries and the ohmic resistance to 0.12 ohm. Copper wire with a diameter of 2 mm. can be used as the material.

The need for an additional ohmic resistance may also be avoided by using a corresponding iron core material for the inductor, since the iron losses develop the same effect, e.g., by eddy currents, as a parallel resistance.

Figure 8:
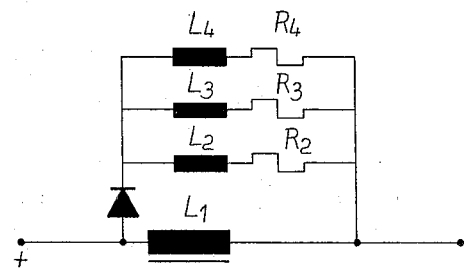
FIG. 8 shows the additional arrangement of a rectifier in the secondary circuit.

A further advantageous arrangement is shown in FIG. 8, in which the system of the additional branch is connected to the branch of the principal inductor by means of a suitable half-wave rectifier; by this the current flow through the additional system can only effect in one direction. The energy which is stored in the principal inductor is thereby prevented from leaking off through the additional system, after the abrogation of the short-circuit and can thus be used to maintain the electric arc.

Obviously, many modifications and variations of the present invention are possible in the light of the above teachings. It is, therefore, to be understood that within the scope of the appended claims the invention may be practiced otherwise than as specifically described.

What is claimed is:

1. An arrangement for influencing the short-circuit time slope of a welding procedure comprising direct current welding means having a flat characteristic including circuit means for making a short-circuit electric arc for a meltable electrode, said circuit including a main inductor, a secondary inductor connected in series to said main inductor, an ohmic resistance in a side branch connected in parallel to said main inductor, the inductance of said main inductor being greater than that of the secondary inductor, and the resistance value of the parallel ohmic resistance being greater than the resistance of the main inductor and the secondary inductor.

2. An arrangement as set forth in claim 1 wherein said main is provided with an iron core for at least partially replacing the resistance in said side branch.

References Cited by the Examiner

UNITED STATES PATENTS 1,761,855   6/1930   Weichsel _____ 219—135

JOSEPH V. TRUHE, *Primary Examiner.*

ANTHONY BARTIS, *Examiner.*